US006916566B2

United States Patent
Saloka et al.

(10) Patent No.: US 6,916,566 B2
(45) Date of Patent: Jul. 12, 2005

(54) SYSTEM AND METHOD FOR RAPID PREHEATING OF AN AUTOMOTIVE FUEL CELL

(75) Inventors: George Steve Saloka, Dearborn, MI (US); James A. Adams, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 448 days.

(21) Appl. No.: 09/682,770

(22) Filed: Oct. 17, 2001

(65) Prior Publication Data

US 2003/0072984 A1 Apr. 17, 2003

(51) Int. Cl.[7] .......................... H01M 8/04; H01M 8/12
(52) U.S. Cl. ........................................ 429/26; 429/22
(58) Field of Search .............................. 429/26, 13, 17, 429/19, 21, 22, 24, 25, 30, 32, 16, 8, 20, 39, 1, 34, 38, 35; 48/127.9, 61, 198.3, 198.2, 94, 214 R; 423/655, 243, 246, 652, 648.1, 244.01; 141/287; 320/101; 62/7, 3.3; 165/140; 436/144; 180/65.1, 65.2; 244/53 R; 431/3, 207; 60/737, 651, 780; 205/637; 96/189; 422/173, 177, 198; 502/407; 208/208 R; 426/26, 13, 17, 19, 21, 22, 24, 25, 30

(56) References Cited

U.S. PATENT DOCUMENTS

| 4,473,622 A | 9/1984 | Chludzinski et al. |
| 6,068,941 A | 5/2000 | Fuller et al. |
| 6,103,410 A | 8/2000 | Fuller et al. |
| 6,521,204 B1 * | 2/2003 | Borup et al. ................. 423/652 |
| 6,635,372 B2 * | 10/2003 | Gittleman ..................... 429/17 |
| 2002/0039672 A1 * | 4/2002 | Aramaki ....................... 429/22 |
| 2003/0049504 A1 * | 3/2003 | Wheat et al. .................. 429/24 |

* cited by examiner

*Primary Examiner*—Michael Barr
*Assistant Examiner*—Robert Hodge
(74) *Attorney, Agent, or Firm*—Tung & Associates; Carlos L. Hanze

(57) ABSTRACT

A system 10 for selectively and rapidly preheating one or more vehicle fuel cells 12 during cold start or freezing conditions. The system 10 includes a bypass valve 26, a controller 30, vehicle sensors 32 and a bypass conduit 54. The controller 30 monitors vehicle attribute data by use of sensors 32 to determine whether a cold start condition exists. Based upon the attribute data, controller 30 may signal valve 26 to bypass heat exchanger 18, and cause compressed air to be delivered directly to fuel cells 12, thereby heating the fuel cells 12.

5 Claims, 1 Drawing Sheet

SYSTEM AND METHOD FOR RAPID PREHEATING OF AN AUTOMOTIVE FUEL CELL

BACKGROUND OF INVENTION (1) Field of the Invention

The present invention relates to a system and a method for rapidly preheating an automotive fuel cell and more particularly, to a system and method which utilizes heat generated by a vehicle air compressor to selectively and rapidly heat a vehicle's fuel cell stack.

(2) Background of the Invention

In order to reduce undesirable emissions and the demand for fossil fuel, automotive vehicles have been designed that are powered by electrical devices such as fuel cells. These "fuel cell-powered electric vehicles" reduce emissions and the demand for conventional fossil fuels by eliminating the internal combustion engine (e.g., in completely electric vehicles) or by operating the engine at only its most efficient/preferred operating points (e.g., within hybrid electric vehicles).

Many fuel cells consume hydrogen gas and air (e.g., as reaction constituents). The consumed hydrogen and air must be properly stored and transferred to the fuel cell at certain temperatures and pressures in order to allow the fuel cell and vehicle to operate in an efficient manner.

Vehicles employing these types of fuel cells often include systems and/or assemblies for storing and transmitting hydrogen gas and air to the fuel cell. Particularly, the hydrogen gas is typically stored within a tank at a relatively high pressure and with a relatively high amount of potential energy. The hydrogen gas is then transferred to the fuel cell by use of several conduits and several pressure-reducing regulators, which lower the pressure of the gas by a desirable amount. The air that is communicated from the fuel cell is obtained at atmospheric pressures and must be pressurized or otherwise driven through the system in order to ensure proper and efficient fuel cell operation. This pressurization and/or driving of air through the system is typically performed by use of a compressor or turbine. These compressors or turbines compress the air to a desired or predetermined pressure, which causes the air to increase in temperature. Because air above a certain temperature can damage a fuel cell or cause the fuel cell to operate inefficiently, the air is passed through a heat exchanger prior to entering the fuel cell, thereby cooling the air and ensuring the air entering the fuel cell does not exceed a predetermined temperature (e.g., 80 degrees Celsius).

In certain conditions, such as cold starting or freezing conditions, it is desirable to heat a vehicle's fuel cells in order to ensure that the fuel cells operate efficiently in a minimal amount of time. Various schemes exist to overcome the cold starting limitations of fuel cells and/or to maintain fuel cells at or above a certain desired temperature. Certain prior vehicles utilize an auxiliary power source, such as resistive heating elements powered by on-board batteries. However, these additional power sources adversely increase the cost, weight and volume of the fuel cell system, drain the vehicle's battery, and consume electrical energy, which could otherwise be used to power the vehicle's electrical components and accessories. Other prior schemes for preheating fuel cells include introducing a hydrogen/air mixture into the process oxidant channels of the fuel cell. However, these prior schemes require complex control systems which undesirably increase the cost and complexity of the vehicle.

There is therefore a need for a new and improved system and method for use with a fuel cell powered vehicle which selectively and rapidly preheats the vehicle's fuel cell stack during cold starting or freezing conditions.

SUMMARY OF INVENTION

A first non-limiting advantage of the invention is that it provides a system and method for selectively and rapidly preheating a vehicle's fuel cell stack during cold starting or freezing conditions, and which overcomes the drawbacks of prior systems and methods.

A second non-limiting advantage of the invention is that it provides a system and method for selectively and rapidly preheating a vehicle's fuel cell stack during cold starting or freezing conditions that does not require an auxiliary power source or a complex control system.

A third non-limiting advantage of the invention is that it provides a system and method for selectively and rapidly preheating a vehicle's fuel cell stack during cold starting or freezing conditions that utilizes heat stored within compressed air, which is transferred to the fuel cell stack, in order to heat the fuel cell stack.

A fourth non-limiting advantage of the invention is that it provides a system and method for selectively and rapidly preheating a vehicle's fuel cell stack during cold starting or freezing conditions that utilizes heat stored within compressed air to preheat the fuel cell stack and to preheat hydrogen gas, which is communicated to the fuel cell stack.

According to a first aspect of the present invention, a system is provided for selectively heating a fuel cell within a vehicle. The system includes an air compressor; and a conduit system which is communicatively coupled to and receives compressed air from the air compressor and which is further communicatively coupled to the fuel cell, the conduit system being effective to selectively deliver the compressed air directly to the fuel cell during cold start conditions, effective to heat the fuel cell.

According to a second aspect of the present invention, a system is provided for supplying air and hydrogen gas to a fuel cell within a vehicle. The system includes a fuel tank which selectively stores the hydrogen gas; a first conduit system which selectively and fluidly couples the fuel tank to the fuel cell, effective to allow the pressurized hydrogen gas to be selectively communicated to the fuel cell; a compressor which is effective to receive and compress the air; a second conduit system which is communicatively coupled to the compressor and to the fuel cell, the second conduit system being effective to receive the compressed air and to allow the compressed air to be selectively communicated to the fuel cell; a first heat exchanger which is operatively disposed within the second conduit system and which is effective to selectively cool the compressed air before the compressed air is communicated to the fuel cell; and at least one bypass valve which is operatively disposed within the second conduit system and which is effective to allow the compressed air to selectively bypass the first heat exchanger.

According to a third aspect of the present invention, a method is provided for preheating a fuel cell stack within a vehicle having a compressor for selectively compressing air, an air conduit system which is communicatively coupled to and receives compressed air from the compressor, and which is further communicatively coupled to the fuel cell stack, and a heat exchanger which is disposed within the air conduit system, and which is effective to selectively cool the compressed air. The method includes the step of selectively causing the compressed air to bypass the heat exchanger and to be communicated directly to the fuel cell stack, thereby heating the fuel cell stack.

These and other features, aspects, and advantages of the invention will become apparent by reading the following specification and by reference to the following drawings.

DETAILED DESCRIPTION

Figure 1:
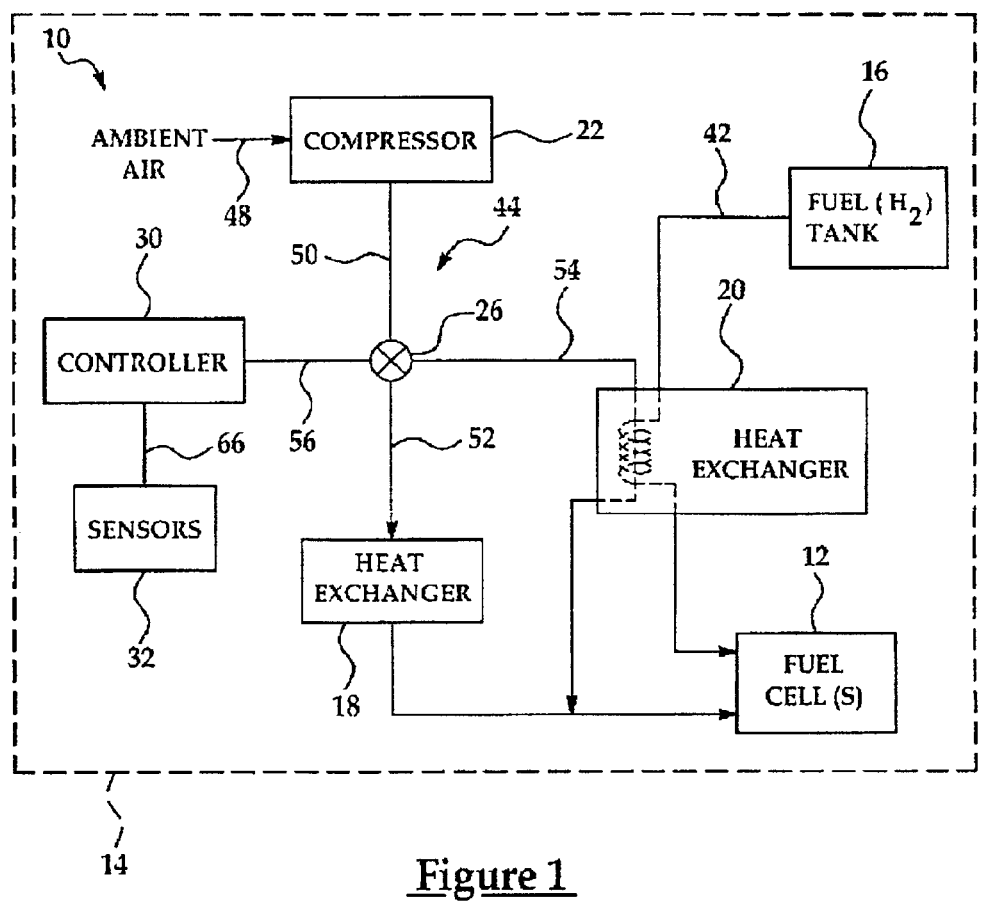
FIG. 1 is a block diagram of a system which is made in accordance with the teachings of the preferred embodiment of the invention, which is adapted for use with a fuel cell powered vehicle, and which is effective to selectively and rapidly preheat the vehicle's fuel cell stack in cold starting or freezing conditions.

Referring now to FIG. 1, there is shown a block diagram of a system 10, which is made in accordance with the teachings of the preferred embodiment of the invention, and which is effective to selectively preheat one or more fuel cells 12 within a vehicle 14. Particularly, system 10 is adapted for use in combination with a vehicle 14 including one or more hydrogen-based fuel cells 12 (e.g., a fuel cell stack) which provide power to the vehicle 14. In the preferred embodiment, vehicle 14 is an electric or a hybrid-electric vehicle, and fuel cells 12 utilize a chemical reaction that consumes hydrogen gas and air (e.g., the oxygen within the air) to generate electrical power. It should be appreciated that while in the preferred embodiment of the invention, fuel cells 12 are of the type which consume hydrogen gas, in other alternate embodiments, other types of compressed gasses can be used to generate power within the fuel cells 12, and system 10 would work in a substantially identical manner to preheat fuel cells 12 and provide substantially identical benefits.

System 10 includes a conventional storage or fuel tank 16 which receives and stores hydrogen gas at a relatively high pressure, a first heat exchanger 18, a second heat exchanger 20, a compressor 22, a bypass valve 26, a controller 30, and vehicle sensors 32.

The system 10 further includes a first hydrogen gas conduit or delivery system 42 which may comprise one or more tubes or conduits that are disposed throughout the vehicle 14 and that selectively carry and transport the hydrogen gas from the tank 16 to the fuel cells 12. Conduit or delivery system 42 may also include one or more conventional pressure regulators. As shown in FIG. 1, conduit system 42 is fluidly coupled to heat exchanger 20 and fuel cells 12.

A second air conduit or delivery system 44 fluidly couples fuel cells 12 to a source of air. Air delivery system 44 includes a first conduit 48 which is coupled to and receives air from the ambient environment external to the vehicle 14, and a compressor 22 which is fluidly coupled to and receives air through conduit 48. System 44 further includes conduit 50 which communicatively and fluidly couples compressor 22 to valve 26, and conduit 52 which is communicatively coupled to fuel cells 12 and valve 26. Conduit 52 traverses heat exchanger 18, effective to cool the air received from compressor 22 prior to delivering the air to fuel cells 12.

A conduit 54, which bypasses heat exchanger 18, is coupled to valve 26 and fuel cells 12. Heat exchanger 20 is operatively disposed within conduit 54 and receives air from conduit 54 and uses the received air to heat the hydrogen gas within conduit 42. It should be appreciated that the present invention is not limited to the foregoing conduit systems or configurations, and that in alternate embodiments, different and/or additional numbers of conduits may be used to interconnect the various components of system 10. For example and without limitation, vehicle 14 may further include exhaust and/or return conduit systems (not shown) which are effective to treat and/or remove exhaust gasses from the vehicle 14 and/or to return unused hydrogen gas to the fuel cells 12.

Controller 30 is respectively, electrically and communicatively coupled to bypass valve 26 by use of electrical bus 56, and to vehicle sensors 32 by use of electrical bus or buses 66.

In the preferred embodiment, controller 30 is a conventional microprocessor based controller and in one non-limiting embodiment, controller 30 comprises a portion of a conventional engine control unit ("ECU"). In other alternate embodiments, controller 30 is externally coupled to the engine control unit.

Fuel tank 16 is a conventional storage tank which is adapted to receive and store compressed gaseous fuel, such as hydrogen gas, at relatively high pressures. In the preferred embodiment, heat exchanger 20 is a conventional gas-to-gas heat exchanger which transfers heat energy from the compressed air passing through conduit(s) 54 to the hydrogen gas passing through conduit(s) 42.

In the preferred embodiment, compressor 22 is a conventional compressor including a turbine or other device which is in fluid communication with conduit 48 and is effective to "draw in" air through conduit 48 (e.g., from the environment external to the vehicle), to compress or pressurize the air and to communicate the pressurized air to fuel cells 12 through conduit 50 and either conduit 52 or conduit 54.

Heat exchanger 18 is a conventional gas-to-fluid heat exchanger which selectively receives compressed air from conduit 52 and coolant (e.g., water) from an external source (not shown). Heat exchanger 18 allows heat energy within the compressed air to be absorbed by or transferred to the coolant, thereby desirably cooling the air that is transferred to the fuel cells 12.

Sensors 32 comprise conventional and commercially available vehicle operating sensors which measure and/or estimate various operating attributes, such as the pressure and temperature of the hydrogen gas and air within various locations in the system (i.e., within various conduits), and the temperature of the outside environment or ambient air. Sensors 32 measure and/or estimate these attributes and communicate signals representing the measured and/or estimated values to controller 30 which uses the signals to actuate and/or operate bypass valve 26 in a desired manner.

Bypass valve 26 is a conventional electronically controlled (e.g., solenoid) valve which allows pressurized air from compressor 22 to be selectively communicated to fuel cells 12 through conduit 52 (and heat exchanger 18) or through conduit 54 (and heat exchanger 20). In other alternate embodiments, different types of bypass valves may be used.

In operation, system 10 utilizes the heat energy stored within the compressed air to selectively heat the fuel cells 12 and hydrogen gas during cold start or freezing conditions. Particularly, when the vehicle 14 is activated during relatively cold temperatures or "cold start conditions" (e.g., temperatures below some predetermined threshold, such as zero degrees Celsius), controller 30 selectively actuates bypass valve 26, thereby transferring the compressed air to fuel cells 12 through conduit 54. This allows the compressed air, which has increased in temperature due to compression, to preheat the fuel cells 12 and to further preheat the hydrogen gas by use of heat exchanger 20.

In order to operate valve 26, controller 30 receives signals from sensors 32 which provide values representing and/or estimating the temperature of the ambient air, the temperature of the fuel cells 12, and/or the temperature of the air and/or hydrogen gas entering the fuel cells 12 (e.g., the temperature of the compressed air). When the temperatures of the ambient air and fuel cells 12 are below certain predetermined threshold values representative of cold start conditions, controller 30 communicates a signal to valve 26, effective to actuate the valve 26 so that the compressed air bypasses heat exchanger 18 and is communicated to fuel cells 12 through conduit 54. The heated air traverses through heat exchanger 20, effective to heat the hydrogen gas, before the hydrogen gas and air are delivered to the fuel cells 12. The heated hydrogen gas and air are effective to relatively rapidly heat the fuel cells 12. As the vehicle 14 and fuel cells 12 are operated and begin to increase in temperature, it becomes desirable to remove heat energy from the compressed air prior to communicating the air to the fuel cells 12. Controller 30 monitors the temperature of the fuel cells 12, the ambient air temperature, and/or the compressed air temperature by use of sensors 32. Once the temperature of either fuel cells 12 or of ambient air exceeds a certain predetermined threshold value, controller 30 communicates a signal to valve 26, effective to channel the pressurized air through conduit 52 and heat exchanger 18. Heat exchanger 18 cools the compressed air to a desirable temperature, thereby preventing potential heat damage to the fuel cells 12 and ensuring that the fuel cells 12 operate at an efficient temperature. It should be appreciated that the predetermined threshold temperatures stored within controller 30 may be based upon various parameters relating to the type of vehicle and type and number of fuel cells 12 that are used within the system 10. In alternate embodiments, the controller 30 may further utilize or consider other vehicle attributes or operating data received from sensors 32 in operating bypass valve 26. In another non-limiting embodiment, heat exchanger 20 is removed from the system, and each of conduits 54 and 42 is directly connected to fuel cells 12.

It should be appreciated that the foregoing system 10 provides for the selective and relatively rapid preheating of fuel cells 12 and of the air and hydrogen gas entering the fuel cells 12. Moreover, the system 10 provides this preheating function in an efficient and inexpensive manner and eliminates the need for an auxiliary power supply and/or heating devices.

It is to be understood that the invention is not to be limited to the exact construction and/or method which has been illustrated and discussed above, but that various changes and/or modifications may be made without departing from the spirit and the scope of the invention.

What is claimed is:

1. A system for selectively heating a fuel cell within a vehicle, said system comprising:

an air compressor;

a conduit system which is communicatively coupled to and receives compressed air from said air compressor and which is further communicatively coupled to said fuel cell, said conduit system being effective to selectively deliver said compressed air directly to said fuel cell during cold start conditions, effective to heat said fuel cell;

a heat exchanger which is disposed within said conduit system and which is effectively to selectively cool said compressed air;

a bypass valve which is operatively disposed within said conduit system and which is effective to selectively cause said compressed air to bypass said heat exchanger and to be delivered directly to said fuel cell during cold start conditions, effective to heat said fuel cell;

a hydrogen gas conduit system which communicates hydrogen gas to said fuel cell; and a second heat exchanger which is coupled to said conduit system and to said hydrogen gas conduit system and which receives hydrogen gas from said hydrogen gas conduit system, said second heat exchanger being effective to allow said compressed air within said conduit system to heat said hydrogen gas before said hydrogen gas is communicated to said fuel cell.

2. The system of claim 1 further comprising:

at least one sensor that is effective to measure at least one operating attribute and to generate a signal representing said at least one measured vehicle operating attribute; and a controller which is communicatively coupled to said bypass valve and to said at least one sensor, said controller being effective to receive said signal and to selectively control said bypass valve based upon the value of said signal.

3. The system of claim 2 wherein said at least one operating attribute comprises ambient air temperature.

4. The system of claim 2 wherein said at least one operating attribute comprises a temperature of said fuel cell.

5. The system of claim 2 wherein said at least one operating attribute comprises a temperature of said compressed air.

* * * * *